US 7,587,061 B1

(12) United States Patent
Pacenti

(10) Patent No.: US 7,587,061 B1
(45) Date of Patent: Sep. 8, 2009

(54) SYMBOL RECOGNITION SYSTEM SOFTWARE AND METHOD

(76) Inventor: James R. Pacenti, P.O. Box 121, Martins Creek, PA (US) 18063

( * ) Notice: Subject to any disclaimer, the term of this patent is extended or adjusted under 35 U.S.C. 154(b) by 731 days.

(21) Appl. No.: 10/744,604

(22) Filed: Dec. 23, 2003

Related U.S. Application Data

(60) Provisional application No. 60/436,430, filed on Dec. 23, 2002.

(51) Int. Cl.
*G06K 9/00* (2006.01)

(52) U.S. Cl. .................................... 382/100

(58) Field of Classification Search ................ 382/100, 382/113, 305, 309, 311; 705/400
See application file for complete search history.

(56) References Cited

U.S. PATENT DOCUMENTS

| | | | | |
|---|---|---|---|---|
| 5,187,784 A | * | 2/1993 | Rowson | 716/7 |
| 5,946,415 A | * | 8/1999 | Su et al. | 382/190 |
| 6,134,338 A | * | 10/2000 | Solberg et al. | 382/113 |
| 6,314,194 B1 | * | 11/2001 | Michael et al. | 382/113 |
| 6,609,244 B2 | * | 8/2003 | Kato et al. | 716/18 |
| 6,707,932 B1 | * | 3/2004 | Chakraborty | 382/113 |
| 6,941,000 B2 | * | 9/2005 | Wong | 382/113 |
| 7,120,318 B2 | * | 10/2006 | Tyan et al. | 382/305 |
| 2002/0026343 A1 | | 2/2002 | Duenke | |
| 2002/0186885 A1 | * | 12/2002 | Zlotnick et al. | 382/224 |
| 2004/0054568 A1 | * | 3/2004 | Bradley et al. | 705/7 |

* cited by examiner

*Primary Examiner*—Brian Q Le
(74) *Attorney, Agent, or Firm*—Charles A. Wilkinson; Clinton H. Wilkinson

(57) ABSTRACT

A simple yet effective manner and system for electronic scanning of construction drawings to obtain the number of various symbol designated facilities such as electrical and plumbing fixtures. Representative symbols are first abstracted from the drawing, are displayed on a monitor and reduced by an operator to their essentials and are then electronically compared with symbols throughout the drawings, with each facility being abstracted and displayed on a monitor for inspection by the operator before being passed to memory for inclusion in a tally of similar fixtures or facilities.

13 Claims, 11 Drawing Sheets

SYMBOL RECOGNITION SYSTEM SOFTWARE AND METHOD

RELATED APPLICATIONS

This application claims priority from provisional application 60/436,430 filed Dec. 23, 2002 in the name of the present inventor.

BACKGROUND OF THE INVENTION

1. Field of the Invention

The present invention relates to a system and method for recognizing and counting symbols and the like on architectural, construction, or other technical blueprints and drawings, and more particularly to a computer automated system using optical character recognition software to define and count such symbols and then generate cost or other reports including job cost information and the like.

2. Preliminary Discussion

In an architectural blueprint or plan or in a technical drawing, or in fact virtually any detailed plan of action, symbols representing different component parts are frequently used to identify the location and number of such parts in the plan or drawing. After a construction plan or blueprint for a building structure is completed by an architect or draftsman, the plan is sent to a general contractor who must approve the plan or return it to the architect to make any requested changes. In every case, in planning a job an accurate count of the total number of parts required by the project is necessary in order to estimate the cost associated with each part in aggregate as well as the cost of the entire project or building structure as a whole. The standard process used to obtain a count of individual symbols on construction drawings is to manually count the individual symbols. Such counting process is tedious and time-consuming, and is seriously prone to errors particularly in bigger projects or where there are large numbers of such symbols. Many companies employ full-time staff to handle the task of counting components when planning various jobs and projects as well as providing construction bids or estimates, so that the process is very labor intensive and costly.

There is therefore a need for an improved system for recognizing and counting symbols representing components and parts on blueprints or construction drawings more quickly and more accurately than is currently available. The system should be capable of assisting a contractor or other user not only in obtaining counts of symbols, but also should be able to count a multiple of symbols at one time and should also be able to identify nonperfect occurrences of a symbol and allow the user to select which symbols are to be included in a count. The system should also allow the symbols to be identified and associated with part numbers, manufacturer, cost, and any other pertinent information about the component or piece being counted. For example, if 15 windows are depicted by a symbol on a construction drawing, the system should be capable of not only counting such symbols but also using such information to generate a job cost report including specific details about such windows. Another desired feature would be to enable a user to quickly obtain measurements between any two points on the print or drawing.

The present inventor has developed such a system and method that allows a user to use a computer system to identify and count any number of symbols on a construction drawing, blueprint, or the like. In the inventor's system, the blueprints are scanned into a suitable computer system, wherein a computer software program developed by the inventor is used to accurately locate and count symbols specified or chosen by the user. In addition, using the present inventor's system a multiple of symbols can be located and counted quickly and accurately simultaneously regardless of how many symbols the user searches for at one time. After a count is performed, job cost reports detailing the number and costs associated with each symbol can also be quickly and easily generated and printed. Furthermore, the software can be used to quickly measure distances between points on a blueprint which is useful in calculating the lengths of pipe or wire required for a job.

While the prior art already contains various systems and methods for aiding in analyzing construction drawing and obtaining cost estimates, it is believed that none of such references or combination of such references discloses method and system containing the particular advantages and features of the present system.

U.S. Pat. No. 4,716,542 issued to C. L. Peltz et al. on Dec. 29, 1987, entitled "METHOD AND APPARATUS FOR SINGLE SOURCE ENTRY OF ANALOG AND DIGITAL DATA INTO A COMPUTER," discloses an apparatus and computer program for entering coordinates in drawings and the like using a spatial coordinated digitizer. Such digitizer includes a coordinate sensing array, a stylus or probe for picking points on the array, and a control unit. In addition, two menuboards are used, one of which is designed particularly for use in construction bid estimation applications. The Peltz et al. system operates in combination with other known construction bid estimation programs, and while such system allows for measuring, scaling, and estimating, it does not appear to contain a disclosure of any means for scanning and then counting particular symbols located on a construction blueprint as an aid to creating a bid estimate.

U.S. Pat. No. 4,782,448 issued to I. Milstein on Nov. 1, 1988, entitled "CONTRACT ESTIMATING SYSTEM UTILIZING A DIGITIZING RULER," discloses a cost estimating system to aid contractors in the bidding process comprised of, as shown in FIG. 1, a digitizing ruler (10) connected to a digitizing board or CRT display (12) having exact X and Y coordinates by output line (28), and a hand held probe (18). Various menus (30) are available on digitizing board (12) which are designed to aid a contractor in calculating and tracking costs and types of parts used in a particular job, while the ruler (10) and probe (18) are used to input information concerning the size of certain parts into memory. While Milstein broadly discloses a digital system for aiding in the calculation of costs and number of parts, such parts still must be counted manually.

U.S. Pat. No. 5,189,606 issued to T. J. Burns et al. on Feb. 23, 1993, entitled "TOTALLY INTEGRATED CONSTRUCTION COST ESTIMATING, ANALYSIS, AND REPORTING SYSTEM," assigned to the U.S. Air Force, discloses a computer program for estimating costs in a large construction project. The Burns et al. system utilizes an inference engine, and while the system accomplishes numerous processes, it does not appear to provide an automatic symbol counting system similar to that of the present invention.

U.S. Pat. No. 5,526,520 issued to G. M. Krause on Jun. 11, 1996, entitled METHOD TO ORGANIZE AND MANIPULATE BLUEPRINT DOCUMENTS USING HYPERMEDIA LINKS FROM A PRIMARY DOCUMENT TO RECALL RELATED SECONDARY DOCUMENTS," discloses a method which makes portions of secondary documents accessible through hotspots on a primary document using a computer processor and program. A measuring scale is included so that quantities of materials such as paint and the like required to be used in a particular area can be estimated, along with the cost of such materials. Krause does not disclose a method for reading and counting particular symbols, however. See also the related Krause patents below.

U.S. Pat. No. 5,625,827 issued to G. M. Krause et al. on Apr. 29, 1997, entitled "METHOD AND SYSTEM OF BLUEPRINT DOCUMENT MANIPULATION," discloses a system or program for electronically storing and manipulating construction blueprints wherein parameters such as length, area, and count of dimensions can be automatically determined, and quantities and costs can be calculated. In the disclosed method, after an image has been stored and displayed on a computer monitor, a scale quantity between two scale points is stored in the document file, and a scale line extending between the two scale points representing the distance between such scale lines is represented. This allows the full-scale dimensions of any drawing to be determined, and aids the contractor in estimating labor and construction costs. The Krause et al. system, however, does not appear to count individual symbols representing units of appurtenant apparatus included in blueprints and plans.

U.S. Pat. No. 5,907,850 issued to G. M. Krause et al. on May 25, 1999, entitled "METHOD AND SYSTEM FOR MANIPULATING CONSTRUCTION BLUEPRINT DOCUMENTS WITH HYPERMEDIA HOTSPOT REFERENCE LINKS FROM A FIRST CONSTRUCTION DOCUMENT TO A RELATED SECONDARY CONSTRUCTION DOCUMENT," discloses a method for manipulating blueprint documents wherein such blueprints are scanned or electronically copied into a computer and stored as a plurality of computer files. A framing means is provided which allows a selected document or drawing from a plurality of documents to be selected and displayed, and a naming means is provided so that specific frames can be identified, with a new file created in memory for each frame name. A correlating means is also provided so that a visual indicator or hotspot on a document can be pinpointed, which hotspot points to a secondary document or file. Software pricing and reporting functions are also included. The primary document is displayed with the secondary documents, linked by hotspots, layered underneath, and when a hotspot is activated, the underneath layer is brought to the top. An interesting feature of the software is the "TAKE OFF" function, wherein a user can define a section of a drawing using "CUSTOM SELECT" mode, and then using a product database calculate the cost of providing such a product in the defined area. Alternatively, a "CHECKLIST" mode can be used to perform similar functions. Various other features, such as zooming in and out etc. are disclosed. A drawing and image manager is also provided. The present Krause et al. patent is directly mainly to the use of "hotspots" for linking primary and secondary documents, and while certain areas of the drawing can be selected and cost figures associated with such area can be calculated, such as the cost of painting or the like, this is not done per se by counting particular symbols for items. An AUTO TRACE feature is also provided, wherein certain portions of an image, such as a roof, can be traced so that calculations can be made of quantities of materials needed and the like. However, such reference does not appear to disclose a program that counts particular symbols on blueprint documents similar to the program of the present invention.

U.S. Pat. No. 5,950,206 issued to G. M. Krause on Sep. 7, 1999, entitled "METHOD AND APPARATUS FOR SEARCHING AND TRACKING CONSTRUCTION PROJECTS IN A DOCUMENT INFORMATION DATABASE," discloses a "mass data storage device" for storing project and document information related to construction projects. While such database also allows costs to be estimated and tracked, using key words to identify particular projects or materials, it does not appear to allow symbols specifying particular items to be counted, selected, or analyzed as in the program of the instant invention.

U.S. PAT. APPLN. NO. 2001/0037190, filed by P. Y. Jung on Apr. 24, 2001 and published on Nov. 1, 2001, entitled "SYSTEM AND METHOD FOR TAKE-OFF OR MATERIALS USING TWO-DIMENSIONAL CAD INTERFACE," discloses a system and method for estimating a bill of materials using a two-dimensional CAD interface wherein such material and cost information is taken from a drawing "without manual work or transformation," and wherein the information is transferred over the Internet. The Jung system is comprised of a computer CAD system having a project information containing unit containing project information and designs, a material/cost containing unit holding material and cost information related to the construction design, a bill-of-material-take-off unit for analyzing material and shape information and estimating costs. In one embodiment, a client who has created a CAD drawing can request "an information provision service of building and construction information," wherein the drawing is apparently transmitted over the Internet by e-mail and cost and material information is taken from the drawing and a cost a detailed estimate sheet is created and transmitted back to the client. Apparently, the material/cost database contains codes for a large number of standard building items, while the bill-of-material take-off processing engine takes readings off of the drawing by performing calculations and referring to information in the material/cost database. A detail take-off sheet is created for each area of a room (see FIG. 5). While the Jung system is apparently able to take information from a CAD drawing to determine cost and material information, such system apparently does not count symbols from blueprint, or construction drawings in the same manner as the program of the present invention.

SUMMARY OF THE INVENTION

A count of construction accessories such as electrical and plumbing fixtures appearing as symbolic representations on construction drawings is obtained by electronic means by scanning the drawings into electronic form and memory if they are not already in such form, abstracting a representative symbol or symbols and rationalizing said symbol or symbols to their most basic and representative form thereafter storing the rationalized symbols in electronic memory to use as standard comparisons, followed by scanning the entire construction drawing or any desired portion thereof and noting electronically those symbols which match the standard. The symbols selected as matches are then displayed on a monitor for checking by the operator to any degree or in any order desired and are then after validation by the operator passed to an electronic tally of all the symbols of that type or form in the drawings, which tally can be read out alone or in combination with the price or cost information.

OBJECTS OF THE INVENTION

It is an object of the invention to provide a system and method for more easily and quickly counting symbols representing components or parts used in a plan of action, typically a construction plan, to obtain an accurate count of such symbols, as well as to generate job cost data and create job cost estimates.

It is a further object of the invention to provide a computer software program for counting symbols on any action play or drawing input into a computer system.

Various features of the present system include the following:
- Standalone software system having the ability to search a blueprint for a specific defined symbol and able to quickly, locate all instances of the symbol and perform a count;
- Use of pattern matching so that the system can locate rotated or partly occluded objects or symbols that otherwise might not be recognized;
- The ability to perform so-called "blob analysis" to decipher hazing or unclear images, with more than 50 shape and gray value features included;
- Use of optical character recognition and verification (OCR/OCV) technology;
- Ability to detection lines, circles, and ellipses with an accuracy of up to 1/50 pixel as well as to store most frequently searched for symbols;
- Once a symbol is recognized, system can automatically calculate price quotes based upon a user identified price per each symbol, as well as print reports for a calculated price quote;
- Can measure distance between any two parts on the plan or drawing.

Still other objects, advantages, and features of the invention will become clear upon review of the following detailed description in conjunction with the appended drawings.

BRIEF DESCRIPTION OF THE DRAWINGS

This invention may be understood from the accompanying claims, specification, and drawings in which

DESCRIPTION OF THE PREFERRED EMBODIMENTS

Figure 1:
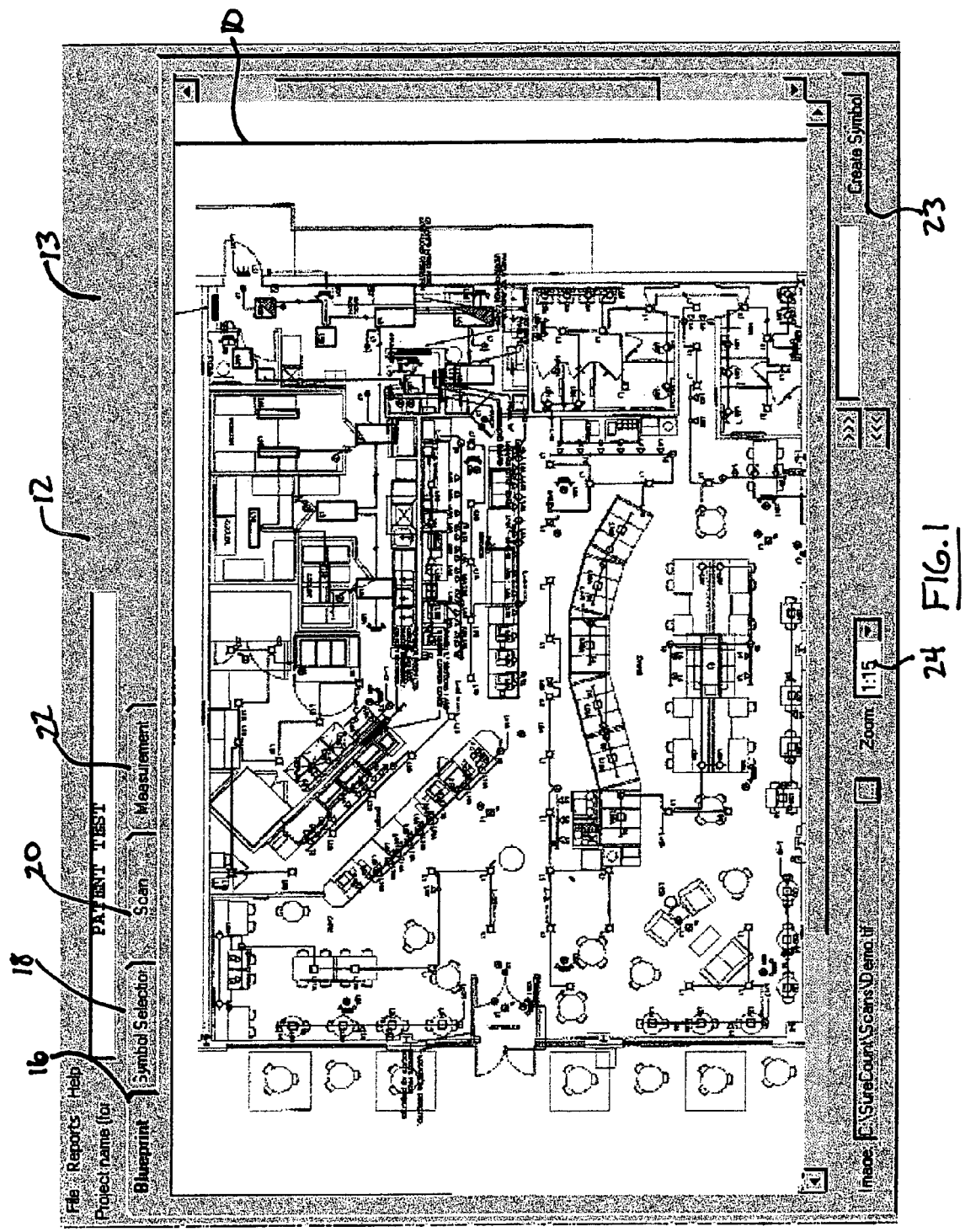
FIG. 1 is a view of a typical blueprint scanned into a computer system incorporating the software.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

There have been construction drawings in electronic form such as, for example, CAD/CAM drawings originally produced by software directed equipment, showing representations of facilities such as plumbing and electrical fixtures and the like. There have also been other systems, such as represented by some of the above cited prior art patents, from which drawings counts of particular facilities can be collected automatically. However, there have, so far as the present inventor is aware, been no relatively simple effective methods for carrying out a tallying of symbols representing facilities and fixtures in construction drawings for use with drawings which are not CAD/CAM produced or, alternatively, for use by users of such drawings who are not CAD/CAM proficient, which includes a majority of contractors and developers. Such contractors and developers have been largely limited to manual counts of the symbols representing such facilities on drawings and blueprints. Such manual counting is, however, labor intensive and, therefore, quite expensive and time consuming and the accuracy is frequently not the best. In an attempt to remedy this difficulty, the present inventor has developed an automatic system of electronic tallying of symbols in construction drawings which is both simple, efficient and very reliable.

In accordance with the invention, a drawing is first reduced to electronic format if it is not already in such form. A symbol representing particular fixtures or facilities such as electrical fixtures or receptacles, plumbing fixtures and the like is identified, preferably directly on the drawing, by a suitable software technique such as lassoing or the like which will excise a certain portion of the drawing from the main body of the drawing. This portion frequently has extraneous lines and structures associated with it. The excised portion of the drawing is thus displayed on a monitor and by known techniques the extraneous lines and other structures may be removed from the representation to, as referred to herein, rationalize the representation into its most basic form as deemed by the operator. This rationalized, or simplified or basic, form of the symbol is then stored in memory and compared by the program with every other symbol in the drawing or portion of the drawing to be reviewed. A running tally of all these representations is kept. Preferably, however, each of the matching symbols extracted from the drawing are also stored in memory and displayed on a monitor in serial order for review by the operator who usually at a glance can determine if the matching is correct and by a click of the control pass the match to the tally operator which may be associated with the addition of price figures and the like. The system is simple and easily operated by the usual developer or contractor or their employees and greatly accelerates the tallying on construction fixtures and the like using the usual construction plans.

Figure 11:
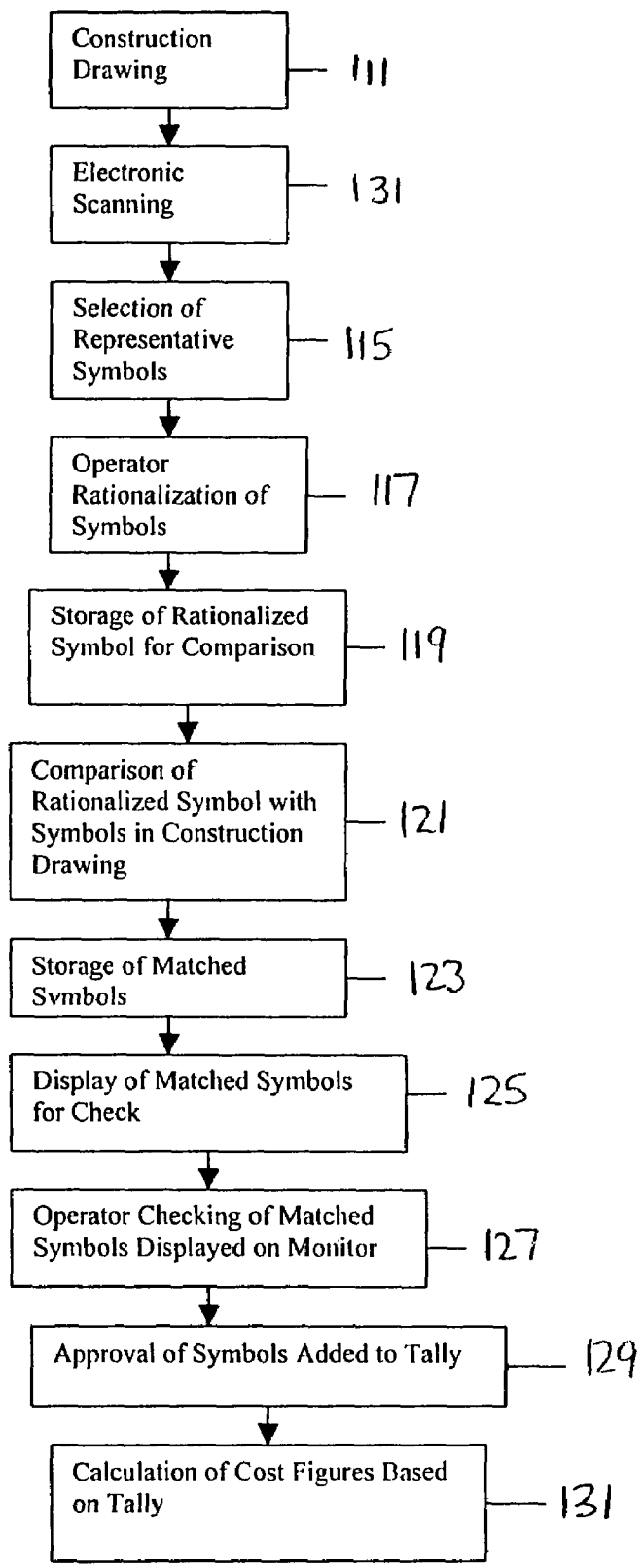
FIG. 11 is flowchart of the steps of the invention.

Going immediately to FIG. 11, which is a general flow diagram illustrating the system of the invention, reference numeral 111 designates a box labeled construction drawing. This drawing, which may be initially in electronic or digital form, or may be scanned to place it in such form, is subjected at 113 to electronic scanning if not already in electronic form. It is at 115 subjected to a selection of representative symbols representing the fixtures to be counted or tallied. This selection is done by the operator at 117 by designating a restricted portion of the drawing on which the symbol occurs frequently by the operation known as lassoing. The designated symbol is then displayed on a monitor and rationalized, or reduced to its most essential form, by blotting out or deleting extraneous elements such as other lines and structures in the designated area. The "rationalized" symbol is then stored at 119 in memory for comparison with other similar symbols in the drawing as at 121. Such comparison will extract from the drawing whatever symbols include the rationalized form of the symbol and closely similar forms. Thus, if there are extra elements present a match will be made if the parts of the rationalized symbol are present. However, if a portion of the rationalized symbol is not present, no match will usually be made. This is why the rationalization operation is very important and why extraneous symbols may possibly be matched also. At this point the matched images or symbols can or could just be immediately tallied. However, it is preferred to first store all the matched symbols and then display them one by one or in some serial order on a monitor to allow the operator to review the matched symbols to determine if they are indeed matches. This is done in steps 123 through 127. All the approved symbols are then passed by the operator to tally usually by a click of the control as each is approved or recognized as proper. See 129. Finally, the tally may be run off or may be combined with cost figures to provide desired costs and the like. All this may be done very quickly without laborious and costly manual counting. However, the very desirable intermediate checks by an operator are maintained for accuracy and reliability. As will be recognized, the method or system is simple and effective, does not require computer literate personnel other than simple computer operator ability and is not expensive.

The software of the present system is preferably used with a computer system compatible with either the Windows NT 4.0, Windows 2000, Windows XP, or subsequent Windows operating system platforms or releases, although other operating system platforms such as Windows 95, Windows 98, Windows Me, Macintosh or Linux may be used. The computer system should have a minimum processor speed of approximately 400 MHz, although a processor speed of 1.5 GHz or greater is recommended. In addition, at least 256 MB RAM memory is required, while 300 MB of hard disk space is required for the program. A 400 D.P.I. minimum scan resolution should be used in scanning blueprints into the computer system, said printer also being a Windows-supported printer a Windows operating systems is used.

The present invention is described below with reference to flowcharts and/or block diagrams illustrations of methods, systems, and computer program products according to an embodiment of the invention. It will be understood that each block of the block diagrams and/or flowchart illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create structures for implementing the functions specified in the block diagram and/or flowchart block or blocks.

These computer program instructions may also be stored in a computer-readable memory that can direct a computer of other programmable data processing apparatus to function in a particular manner, such that the instructions stored in the computer-readable memory produce an article of manufacture including instructions which implement the function specified in the flowchart block or blocks and/or in the block diagram. The computer program instructions may also be loaded on a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

FIG. 1 shows a construction drawing 10 that has been previously scanned or input into a computer system having the software program of the present invention stored on the computer hard disk or otherwise associated with such system. Once a drawing has been input into the system in the usual manner according to the particular scanning or electronic copying arrangement being utilized, drawing 10 will be visible in a computer screen window 12, with the computer program having normal drop-down menus and the like which type are generally associated and compatible with the Windows operating system manufactured by Microsoft Corporation of Redmond, Wash. As shown in FIG. 1, several tabs are provided related to carrying out different tasks, including tabs labeled "Blueprint" 16 for viewing the drawing and creating or defining symbols, "Symbol Selection" 18 for selecting a symbol or symbols to be searched, "Scan" 20 for scanning a new document or drawing into the system, and "Measurement" 22 for measuring the distance between any two points in the drawing. As also shown in FIG. 1, wherein the "Blueprint" tab 16 is selected, the blueprint 10 can be viewed at various zoom levels using zoom scale or level via drop-down menu 24. This allows the size of the drawing on the computer screen to be changed so that any part of the construction drawing can be easily zoomed in on. By selecting the desired zoom level on menu 24, the user can view any portion of the drawing more closely when desired, such as when creating a symbol, or when selecting a symbol to search for or simply to more closely analyze a section of the blueprint, while also still allowing the entire drawing to be quickly viewed simply by zooming out.

Figure 2:
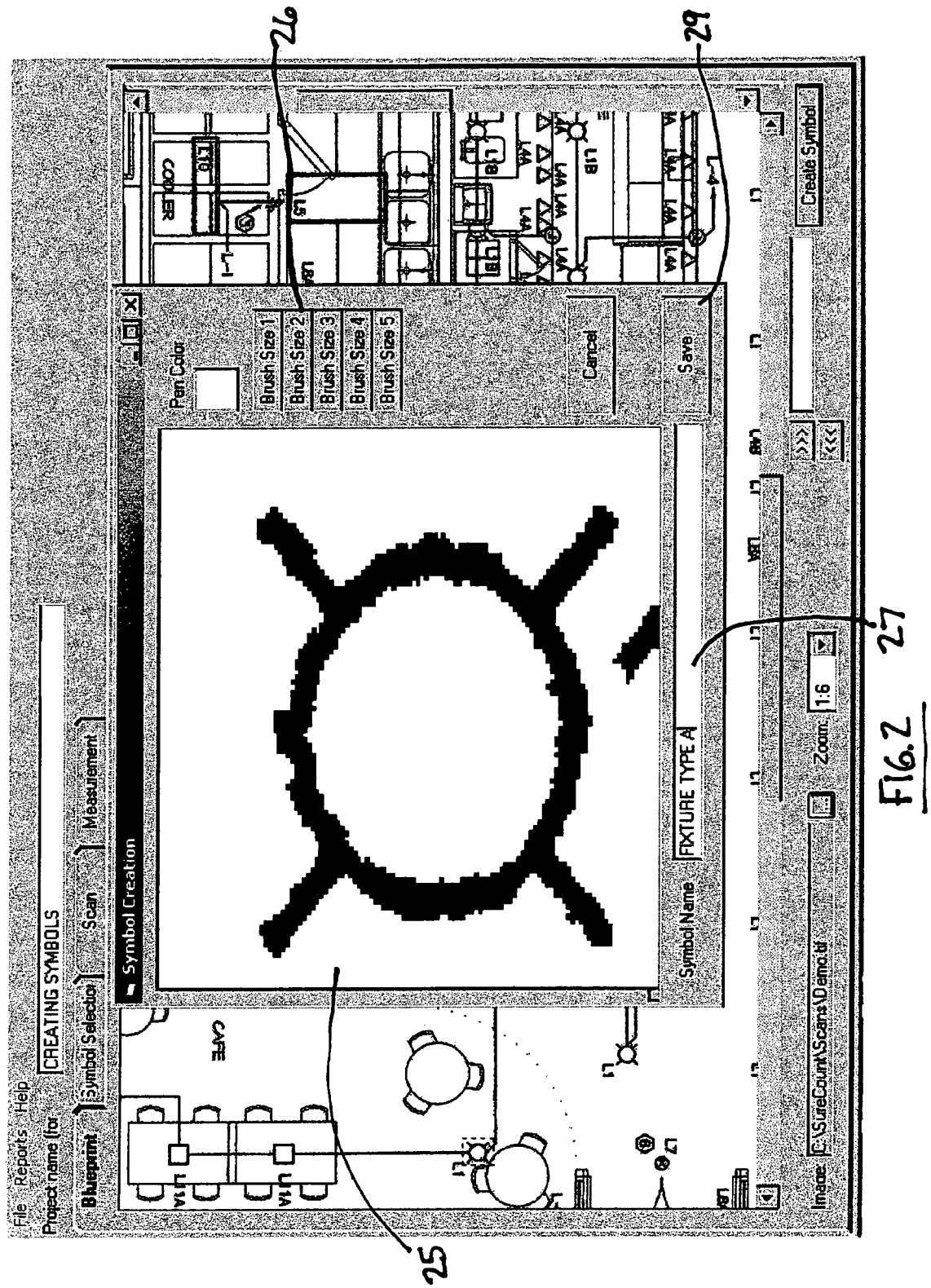
FIG. 2 is a view of the symbol creation screen of the invention for defining and creating symbols.
Figure 3:
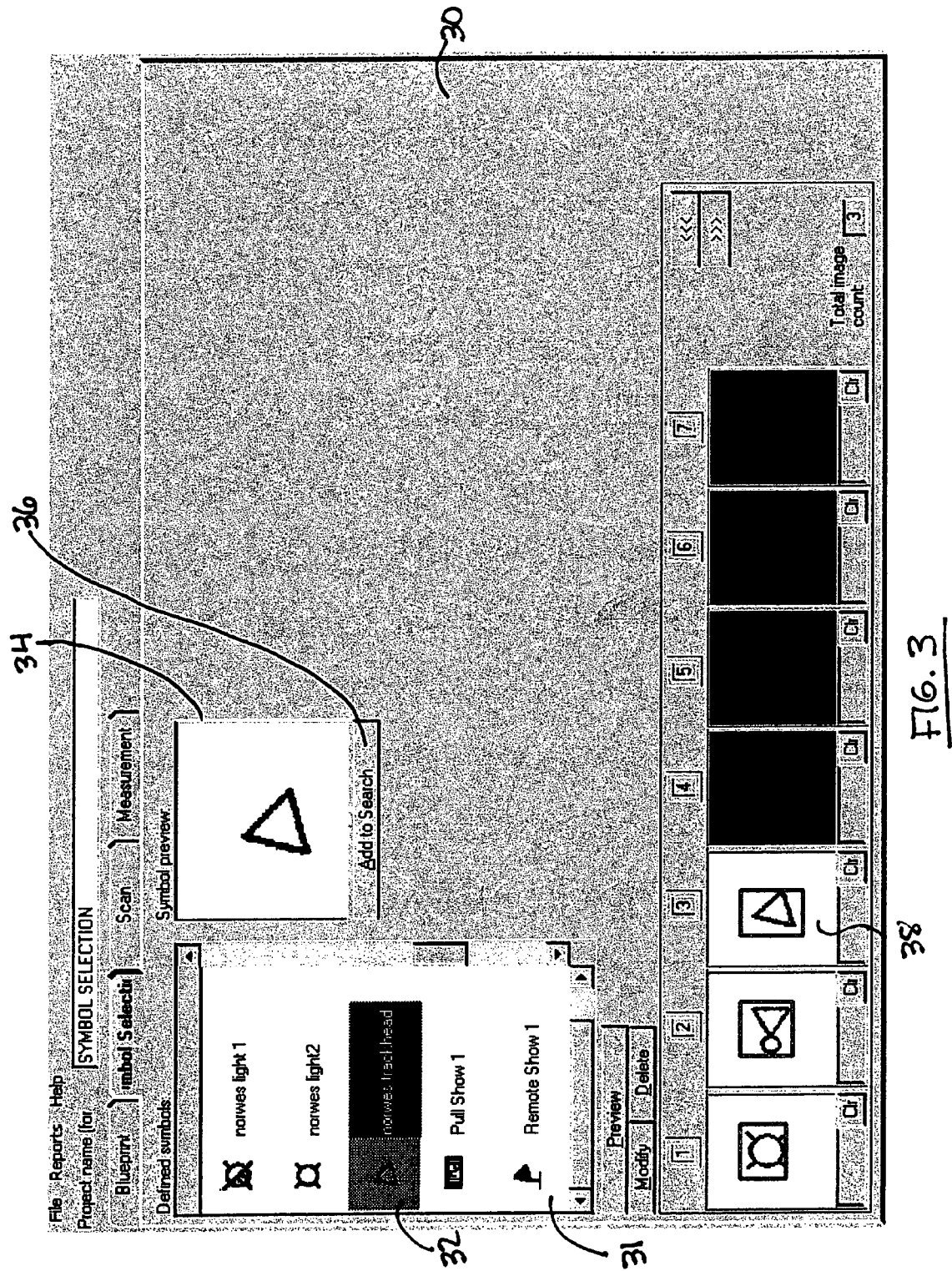
FIG. 3 is a view of the symbol selection screen of the invention for choosing symbols to be searched and counted.

The symbol creation utility of the invention, which allows the user to define particular symbols found in the blueprint is explained with particular reference being made to FIGS. 2 and 3. Before a symbol can be recognized by the software and selected for counting, it must be defined. This is done by zooming in on and then highlighting a section of the scanned blueprint including the desired symbol or symbols to be selected, making sure that the symbol or symbols to be defined are highlighted. Then, the user will click on the "create symbol" button 23 shown in FIG. 1 to select such symbol, after which the selected material will appear in the Symbol Creation 25 screen, shown in FIG. 2. The symbol creation utility also includes a means for "cleaning up" or cropping out each selected symbol prior to defining it. This utility allows the user to digitally, erase, delete, or smooth out any extra lines attached to each symbol prior to defining the symbol using the brush buttons 26 shown in FIG. 2. Each brush button 26 refers to a digital brush of a different size or shape and is selected according to the quantity or type of "cleaning up" to be performed. This process is performed using techniques similar to those which are common in known paint programs such as the Microsoft Paint program. After the new symbol has been created, it is given a name by typing such name in the Symbol Name window 27 and is saved by the system software by clicking save button 29. Defined symbols will then be permanently saved and may be re-used until manually deleted from the symbol list. An unlimited number of symbols can be created in the manner described above until all of the components or parts on the blueprint which are desired to be counted have been defined.

Once all of the desired symbol settings have been defined, any one of the symbols can be searched for on the digital blueprint. To search for a symbol, first the user will click on the "Symbol Selection" tab 18, which brings up a search screen similar to screen 30 shown in FIG. 3. Each of the symbols defined by the user in the manner described above will be shown listed by symbol name in a column in window 31. To select a symbol from the column to be searched, the user simply clicks on the name of the saved symbol 32 listed in window 31, after which such symbol is extracted from the symbol selection column and a representation of the chosen symbol will be highlighted in Symbol Preview window 34. If the user wishes to add the selected symbol to the search, he or she will click on "Add to Search" button 36 beneath Symbol Preview window 34, after which the symbol shown in window 34 will appear in one of the selected symbol window 38 shown in FIG. 3 at the bottom of the screen wherein symbols which have been selected for searching are highlighted and are visible.

Figure 4:
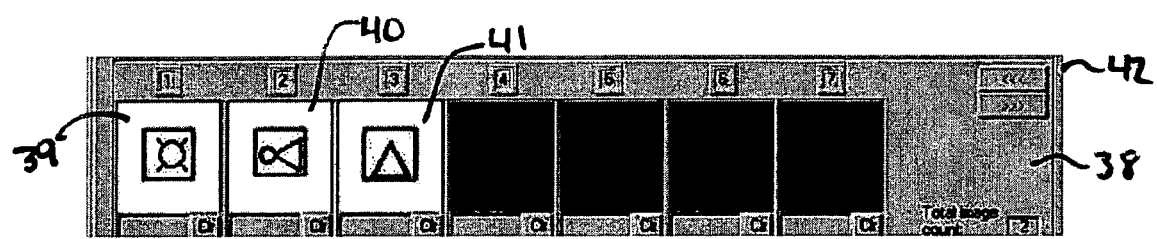
FIG. 4 illustrates the selected symbols portion of the symbol selection screen shown in FIG. 3.

FIG. 4 is a closeup view of the selected symbol box 38 shown in FIG. 3. An important feature of the preferred embodiment of the present inventor's system and method is that the system is capable of searching for multiple symbols at any one time, either within a certain area or region of the drawing or throughout the entire drawing. (See FIG. 5). Therefore, while as shown in FIG. 4 three symbols 39-41 have been selected for searching, any number could have been selected. If not all of the windows 38 containing symbols selected for searching during scan are visible on the screen at one time, the user can scroll to the left or right using scroll buttons 42 to view such other symbols. Selected symbols can also be deselected if the user does not wish to search for such symbol. The number of symbols selected to count has no bearing on the actual amount of time taken to perform a count.

Figure 5:
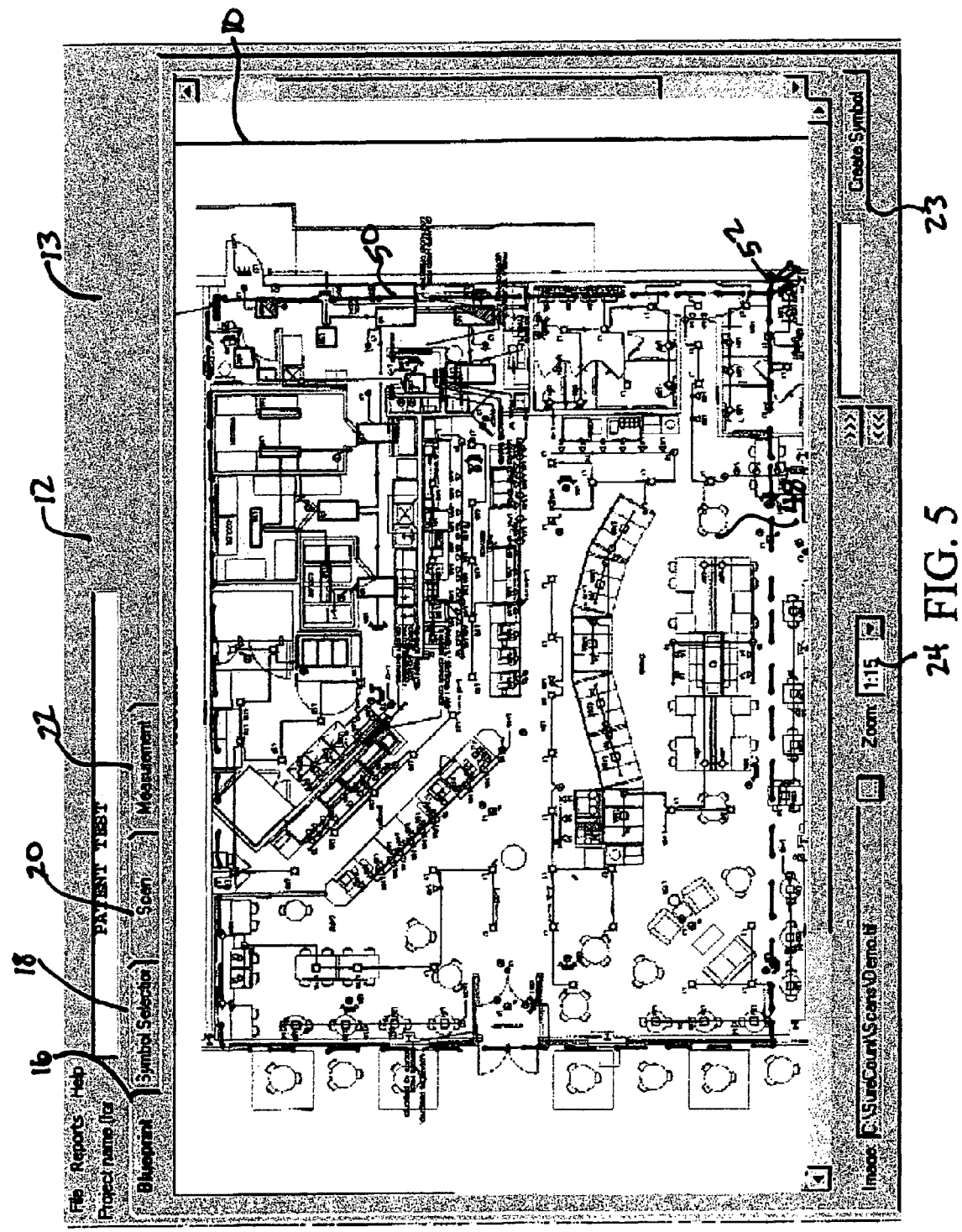
FIG. 5 illustrates the "Lasso" feature of the invention for defining the area of a drawing to be searched for the selected symbols.

Once the desired symbols to be searched for have been defined and selected as described above, in preparing a drawing for a search the user next must select the area of the drawing to be searched. This is accomplished simply, as illustrated in FIG. 5, by using the "Lasso" feature, wherein the area to be selected is outlined, preferably using the attached computer mouse, by drawing a box around such area on the screen. To define or select an area, first the user clicks on one corner of the area of the drawing 10 to be highlighted 48. Then, while holding the mouse button down, the cursor arrow is moved to the other corner of the area to be selected. The perimeter of such area is outlined by a dotted line or box 50, with arrow 52 being in the most recently selected corner. The program will then scan such area within the confines of the Lasso for all selected symbols. A typical search will last for approximately two to five minutes, depending on the complexity of the symbol being searched for and the size of the area selected rather than the number of symbols selected. The "Lasso" type technology used for highlighting an area of a computer screen or the like is of a type well known to those of ordinary skill in the relevant prior art After the symbols have been selected for scan, when searching for selected symbols, the pattern recognition technology of the standalone software program, which is the core of the system, will search the blueprint for a specified defined symbol and will locate all instances of the symbol and perform a count using the computer mathematical processor. The pattern matching system will detect not only "perfect" or identical copies of such symbols, but will also automatically detect slightly different versions of the symbols, but which are closely similar to the symbol. For example, if the symbol on the drawing is turned at a different rotation or is scaled up or down in size, the program will still highlight such symbols. In addition, the system will perform a so-called "blob analysis", which is a standard but powerful process in image processing to correctly decipher an image, to decipher hazing or unclear images, and should have the ability to decipher more than fifty shape and value features. A blob consists of image pixels connected in that one can travel from any to any point in the blob passing only the points with the same color. Typically blobs are extracted from binarized images, but conceptually any type of image can be converted into blobs. Preprocessing steps, such as spatial and morphologically filtering, may be used to improve blob data.

Optical character recognition and verification (OCR/OCV) technology of a known type is also utilized by the system. Such system can detect lines, circles, and ellipses with an accuracy of up to $1/50^{th}$ of a pixel resolution. These features are critical to the overall effectiveness of the program since it is not unusual for symbols to be connected to other lines or symbols representing different components, and in addition to be in different sizes or disposed at disparate angles depending on the requirement of the construction plan or drawing.

Figure 6:
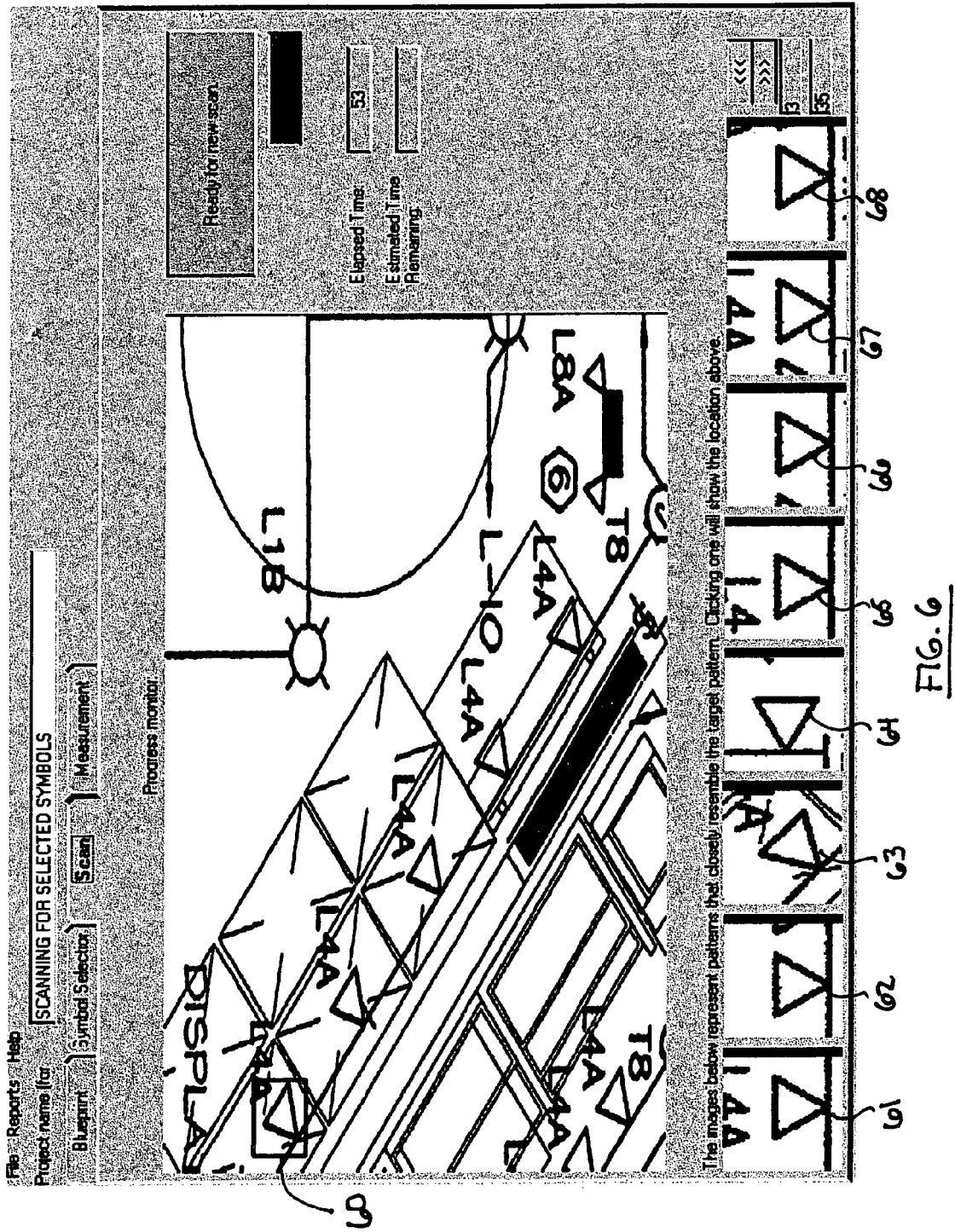
FIG. 6 shows a screen for use in choosing closely similar symbols found during the selection process and distinguishing between symbols.

FIG. 6 illustrates an area of a drawing wherein a symbol such as at numeral 60 on the blueprint has been identified by the program as being possibly one of the selected symbols. Text situated under the large window in FIG. 6 states "The images below represent patterns that closely resemble the target pattern. Clicking one will show the location above." In the example shown in FIG. 6, the program has identified three symbols 61, 62, and 63 that closely resemble one of the symbols in the list. Furthermore, the program allows the user to click on each of such symbols, wherein its location will be shown on the screen. This feature allows the user to manually select or deselect symbols which the program has identified as potential, but not confirmed, selected symbols. In this way, the user can individually analyze all of the possible symbols and ensure that only appropriate symbols are selected and counted.

Figure 7:
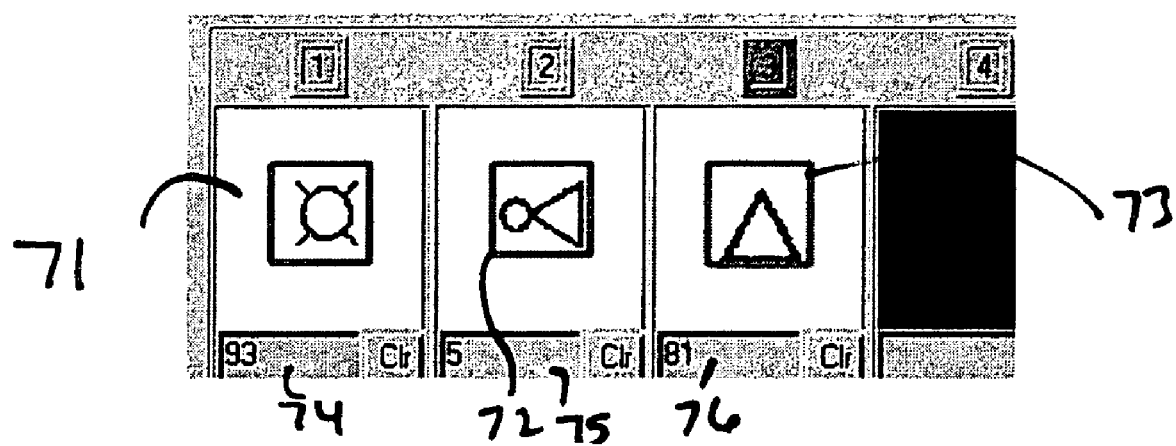
FIG. 7 is a view of the selected symbols portion of the symbol selection screen after a search has been performed.
Figure 8:
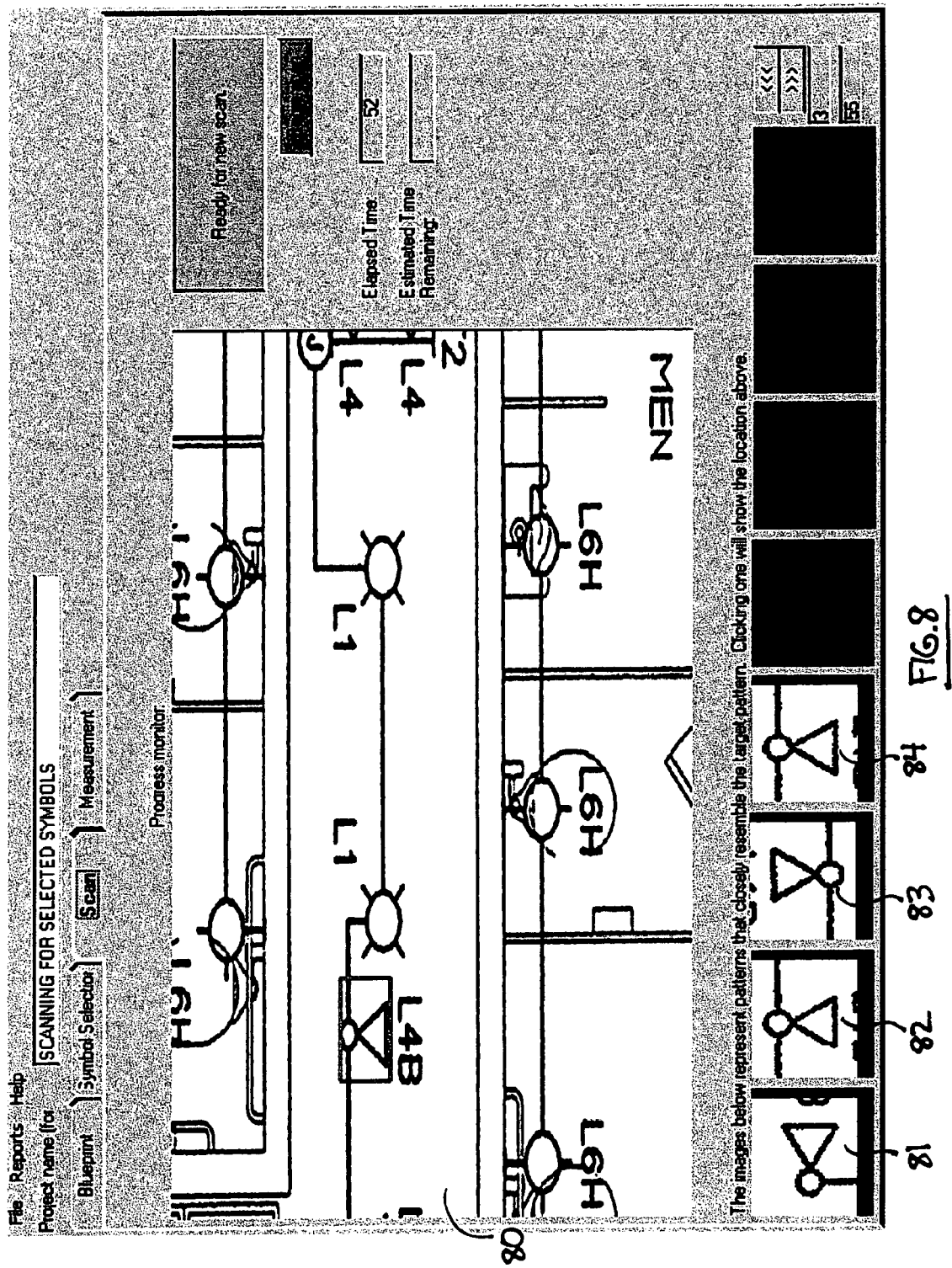
FIG. 8 is a view of the "Scan" screen after a search has been performed illustrating the selected symbols.

The program will search a print for the specified symbols, count and keep track of the total number of occurrences of each symbol found, and as shown in FIG. 7, list the number of occurrences of each symbol. For example, in FIG. 7, the symbol shown in window 71 was found ninety-three times, which is indicated in small window 74, the symbol in window 72 was found five times, which is indicated in small window 75, and the symbol in window 73 was found eighty-one times, which is indicated in small window 76. The software program also keeps track of the location of each symbol occurrence, so that all occurrences of each symbol found during the search can be viewed. Referring now to FIG. 8, shown in windows 81, 82, 83, 84, and 85 are the five occurrences of the symbol shown in window 72 in FIG. 7. Since the program tracks the location of each symbol occurrence, when the user clicks on or selects one of symbols, such selected symbol will also be highlighted in the large window screen showing its exact position on the blueprint. For example, in FIG. 8, the small arrow in window 84 indicates that this symbol has been selected, causing such symbol to also be highlighted in its position on the actual blueprint in large window 80. This is another very useful feature of the present invention as it aids the user in determining whether the selected symbol actually belongs to the set of desired symbols, which decision the user can make by referring to the symbol in relation to the overall blueprint rather than in the abstract in small window 84. The user may then either confirm that such symbol should be selected or deselect the symbol. This allows the user the ability to omit or include symbols individually per his or her needs, whether or not the correct symbol has been selected.

Figure 9:
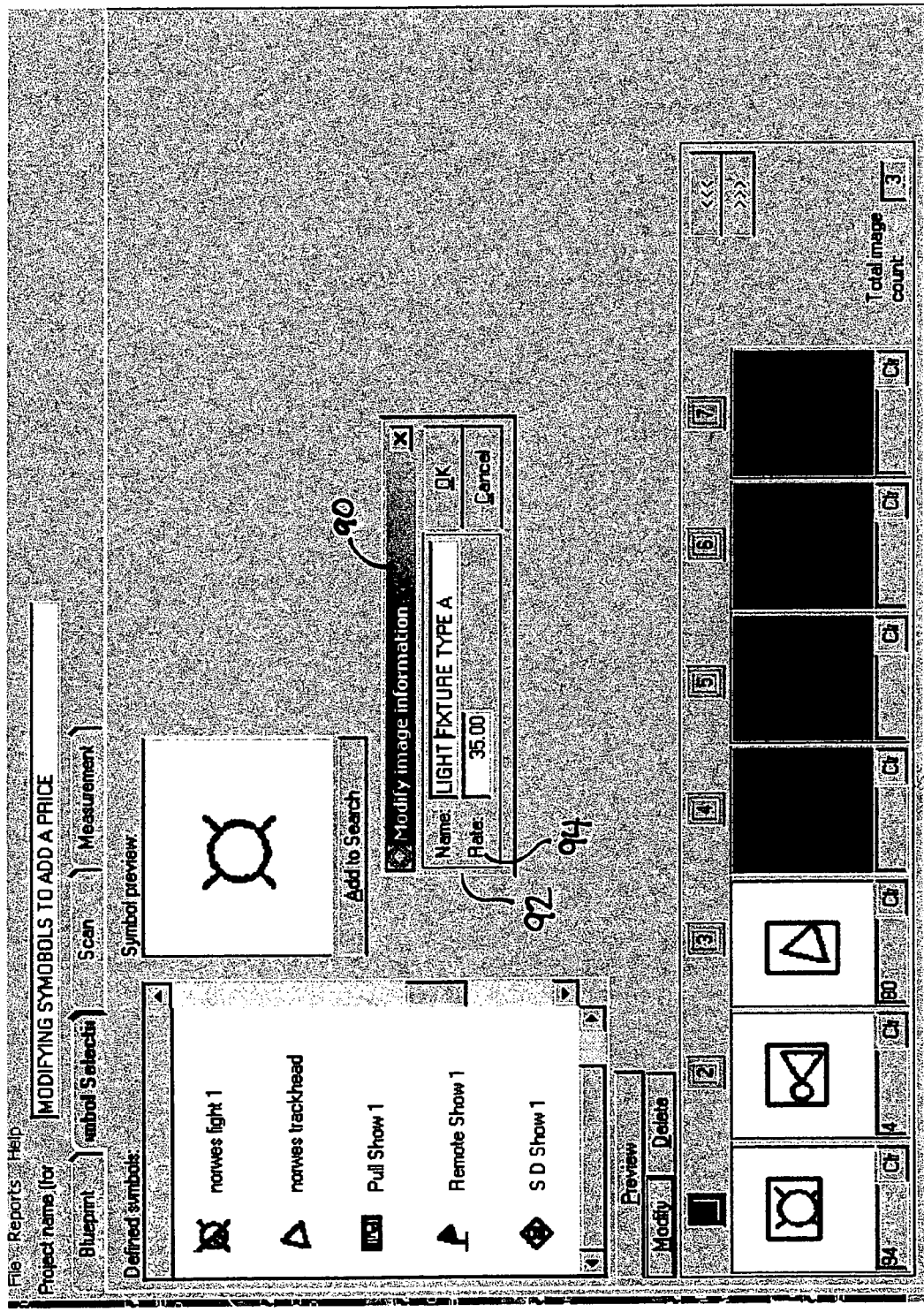
FIG. 9 illustrates the Image Information Screen wherein the user can name a symbol and input price and other information about a symbol

Another important feature of the present invention is the ability to use the completed counts of selected symbols in generating reports containing useful information related to the project represented on the blueprint, such as an estimation and calculation of costs associated with the goods or parts represented by such symbols. For example, once the selected symbols have been searched for and counted, such information can be combined with price information so that the total customer price for the items represented by such symbols can be calculated automatically. FIG. 9 illustrates a small screen 90 captioned "Modify Image Information" wherein information about the particular symbol such as a generic Name 92 of the good represented by the symbol, such as a Light Fixture, and the Rate or price per unit 94 can be input. Other information such as product number, color, size, and the like could also be entered if desired. Once the price is set for a symbol or object, with the click of a button the software will calculate the total price for the item. The system is very flexible so that prices and other information may also be easily updated or varied for different blueprints, jobs, suppliers or the like as is required. Reports containing such information can then be generated with respect to one symbol, groups of symbols, or all of the symbols as desired. Such information is very useful in estimating the costs related to completion of various portions of the job or the entire project, and the reports may copied, printed, forwarded electronically or used in other ways as desired.

Figure 10:
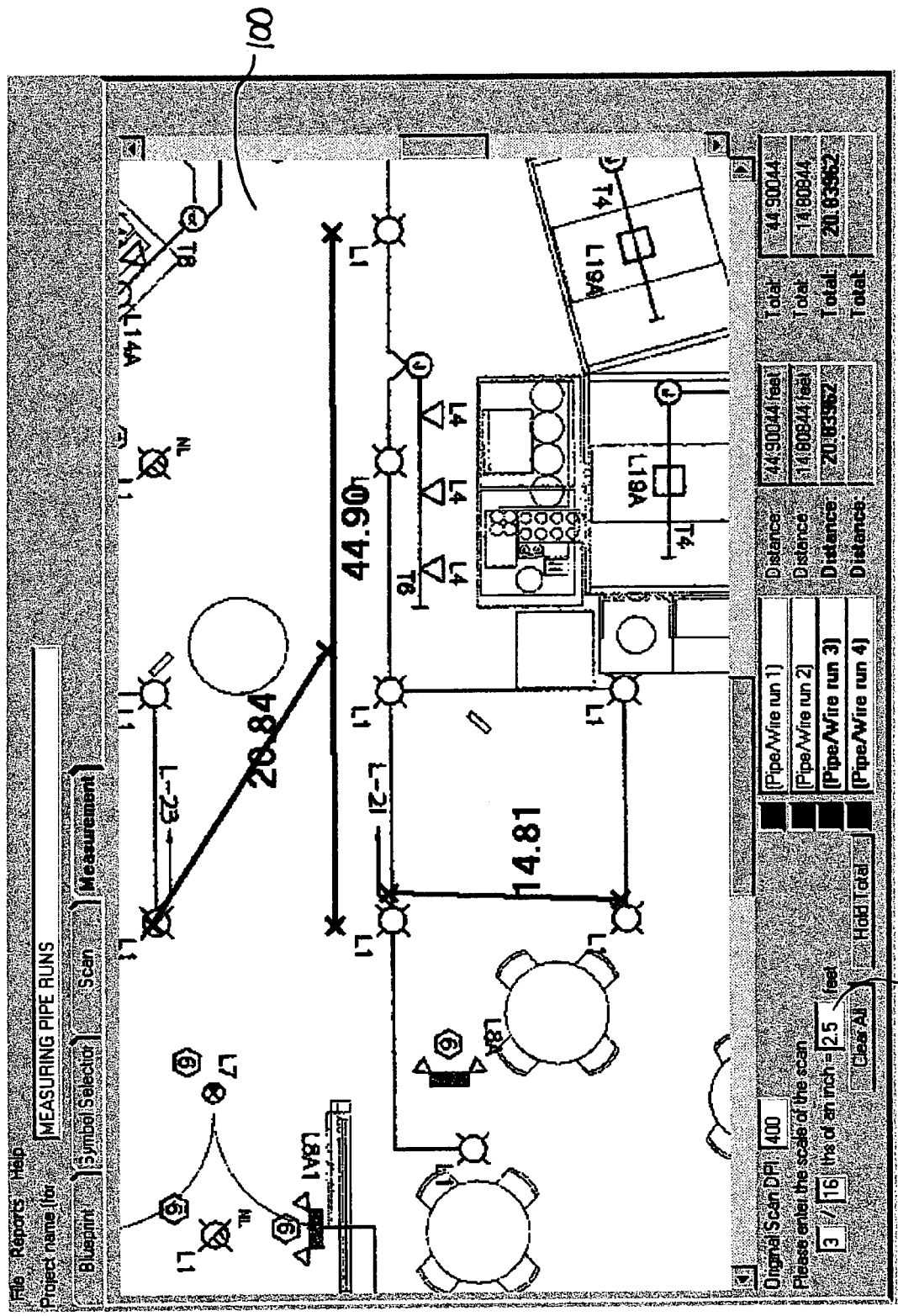
FIG. 10 illustrates the measurement screen of the invention

The system of the present invention may also be used to measure distance, such as distances between two symbols, lines, or points in the construction drawings. This feature enables the present system to be easily used to measure lengths pipe or wire runs, for example, as well as virtually any other distance. FIG. 10 illustrates the "Measurements" screen or window 100 which is accessed by clicking on Measurements button 22. Before a correct measurement may be made, the scale of the blueprint must be input into the system, which information is input in window 10. Thereafter, measurements can be taken simply by clicking on a first point on the screen from which the measurement is to be taken and then clicking on the second measurement. The program will then automatically calculate the distance between such points, and the run totals will appear at the bottom of the screen. Intermediate points between such distance can also be measured. In FIG. 10, the x and y coordinates of the first and second point are displayed at box 102, as is the distance between such points.

While the present system has been described as being used on or in connection with architectural blueprints, construction drawings and the like, it may be appreciated that the system could be used to identify and count virtually any item in a document, such as lines, letters and the like, and is not limited to the use shown.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A method of determining a count of construction accessories and estimating wire and pipe run requirements and costs appearing on building construction drawings in symbolic form comprising:
    using a computer to perform the following steps of:
    (a) entering the construction drawings in electronic format into a software program having the capacity to recognize symbols on said drawings;
    (b) defining selected symbols appearing in the construction drawings for which it is desired to obtain a count of by abstracting a portion of the drawing containing such symbols and displaying such portion on a monitor to allow the symbols to be rationalized when necessary by digitally removing extraneous portions of the drawing from the abstraction of the symbols displayed on the monitor;
    (c) entering the rationalized symbols into memory and thereby verifying said symbols;
    (d) electronically scanning the entire drawing noting each match or occurrence of a symbol conforming to a verified symbol and adding to a running tally of such symbols noted; and
    (e) at completion of electronic scanning providing a count of the matches of symbols in the drawing, and measuring distances between any two points or objects on said drawing in both vertical and horizontal dimensions to obtain an estimate of wire and pipe run requirements and costs.

2. A method of determining a count of construction accessories and estimating wire and pipe run requirements and costs in accordance with claim 1 wherein after the entire construction drawing is scanned and before those images that are selected as matches are entered into a permanent tally of symbols, the symbols selected as matches are displayed on a monitor for visual checking as to the validity of the match and are added to the tally when approved by the operator as a valid match.

3. A method of determining a count of construction accessories and estimating wire and pipe run requirements and costs in accordance with claim 1 wherein the initial construction drawing is initially electronically scanned to convert it into electronic format for manipulation in counting symbols on said drawing.

4. A method of determining a count of construction accessories and estimating wire and pipe run requirements and costs in accordance with claim 2 wherein location coordinates with respect to the construction drawing are provided with respect to the matches of symbols made and displayed for visual checking in order to enable the surrounding environment of each symbol noted when verifying the symbols matched.

5. A method of determining a count of construction accessories and estimating wire and pipe run requirements and costs in accordance with claim 1 wherein said software program can recognize symbols on the construction drawings irrespective of whether the drawings were created manually and converted into electronic form or created electronically using another program.

6. A method of determining by computer means a count of construction elements and estimating wire and pipe run requirements and costs appearing on electronically encoded construction drawings comprising:
    (a) exposing the construction drawings to an optical monitor programmed to recognize a predetermined collection of symbols of construction or building elements;
    (b) storing all those symbols selected;
    (c) displaying in serial order on a monitor all those symbols selected;
    (d) reading out the final count of symbols for use in estimating job and parts costs; and
    (e) measuring the distances between any two points or objects on said drawing in both vertical and horizontal dimensions to obtain an estimate of wire and pipe run requirements and costs.

7. A method of determining a count of construction elements and estimating wire an pipe run requirements and costs as in claim 6 wherein prior to the step of reading out a final count of symbols, the symbols are visually displayed and reviewed by an operator, who either approves or rejects the symbols for inclusion in said final count.

8. A computer implemented system for obtaining an accurate count of symbols on a construction drawing representative of one or more fixtures comprising:

means for defining, rationalizing and storing symbols to be counted on said drawing;

means for selecting at least one stored rationalized symbol to be searched for in an area of said drawing, and means for searching for, analyzing, and identifying perfect and nonperfect occurrences of the stored rationalized symbol in said area using an optical character recognition engine;

means for tracking and counting the number of perfect and nonperfect occurrences of stored rationalized symbol identified in the area of the drawing selected;

means for locating and reviewing the perfect and nonperfect symbols identified as containing the stored rationalized symbol to confirm a match with said stored rationalized symbol and providing an accurate count of the confirmed matching symbols; and means for measuring the distance between any two points or objects on said drawing in both vertical and horizontal dimensions to be used in estimating wire and pipe run requirements and costs.

9. The system of claim 8 additionally comprising means for converting said drawing into an electronic format for accessing and use with said system.

10. The system of claim 8 additionally comprising means for estimating costs associated with the fixtures represented by the confirmed matching symbols.

11. The system of claim 8 additionally comprising means for selecting from a previously defined list of symbols a symbol to be counted.

12. The system of claim 8 additionally comprising means for selecting, searching and counting multiple symbols on a drawing simultaneously without substantially increasing the amount of time required to conduct the search.

13. The system of claim 8 additionally comprising means for closely viewing and analyzing portions of a drawing surrounding a symbol identified as containing the stored rationalized symbol to aid in determining whether an identified symbol should be selected for inclusion in the final count of said confirmed matching symbols, or deselecting individual symbols to be omitted from the final count.

* * * * *